(12) United States Patent
Aggarwal et al.

(10) Patent No.: US 8,605,723 B2
(45) Date of Patent: *Dec. 10, 2013

(54) MPLS TRAFFIC ENGINEERING FOR POINT-TO-MULTIPOINT LABEL SWITCHED PATHS

(75) Inventors: Rahul Aggarwal, Menlo Park, CA (US); George Apostolopoulos, Vancouver (CA); Liming Wei, Fremont, CA (US)

(73) Assignee: Ericsson AB, Stockholm (SE)

( * ) Notice: Subject to any disclaimer, the term of this patent is extended or adjusted under 35 U.S.C. 154(b) by 162 days.

This patent is subject to a terminal disclaimer.

(21) Appl. No.: 13/305,662

(22) Filed: Nov. 28, 2011

(65) Prior Publication Data

US 2012/0069844 A1     Mar. 22, 2012

Related U.S. Application Data

(63) Continuation of application No. 12/341,842, filed on Dec. 22, 2008, which is a continuation of application No. 11/045,196, filed on Jan. 27, 2005, now Pat. No. 7,477,642.

(60) Provisional application No. 60/541,892, filed on Feb. 3, 2004.

(51) Int. Cl.
*H04L 12/28*     (2006.01)
*H04L 29/02*     (2006.01)

(52) U.S. Cl.
USPC ............... 370/390; 370/395.2; 370/395.5

(58) Field of Classification Search
None
See application file for complete search history.

(56) References Cited

U.S. PATENT DOCUMENTS

| | | | |
|---|---|---|---|
| 5,831,975 A | 11/1998 | Chen et al. |
| 6,236,657 B1 | 5/2001 | Andersson et al. |
| 6,751,221 B1 | 6/2004 | Saito et al. |
| 7,372,853 B2 | 5/2008 | Sharma et al. |
| 7,477,642 B2 | 1/2009 | Aggarwal et al. |
| 2001/0048683 A1 | 12/2001 | Allan et al. |

OTHER PUBLICATIONS

Yasukawa et al., Extended RSVP-TE for Point-to-Multipoint LSP Tunnels, draft-yasukawa-mpls-rsvp-p2mp-04.txt, Network Working Group, Internet Draft, Feb. 2004, 30 pages.
Yasukawa et al., Extended RSVP-TE for Point-to-Multipoint LSP Tunnels, draft-yasukawa-mpls-rsvp-p2mp-03.txt, MPLS Working Group, Oct. 2003, 36 pages.
Yasukawa et al., Extended RSVP-TE for Point-to-Multipoint LSP Tunnels, draft-yasukawa-mpls-rsvp-p2mp-02.txt, MPLS Working Group, Internet Draft, Jun. 2003, 36 pages.
Yasukawa et al., Extended RSVP-TE for Point-to-Multipoint LSP Tunnels, draft-yasukawa-mpls-rsvp-p2mp-01.txt, MPLS Working Group, Internet Draft, Mar. 2003, 38 pages.
Yasukawa et al., Extended RSVP-TE for Point-to-Multipoint LSP Tunnels, draft-yasukawa-mpls-rsvp-p2mp-00.txt, MPLS Working Group, Internet Draft, Jan. 2003, 49 pages.

(Continued)

*Primary Examiner* — Marsha D Banks Harold
*Assistant Examiner* — Matthew Campbell
(74) *Attorney, Agent, or Firm* — Blakely, Sokoloff, Taylor & Zafman LLP

(57) ABSTRACT

A method and apparatus for providing point-to-multipoint label switch paths (LSPs) in a Multi-Protocol Label Switching (MPLS) network is described. In one embodiment, a point-to-multipoint LSP is built in a MPLS network by using Resource Reservation Protocol Traffic Engineering (RSVP-TE) to signal the point-to-multipoint LSP as separate point-to-point LSPs and to merge the separate point-to-point LSPs into the point-to-multipoint LSP.

24 Claims, 13 Drawing Sheets

(56) References Cited

OTHER PUBLICATIONS

Yasukawa et al, Extended RSVP-TE for Multicast LSP Tunnels, draft-yasukawa-mpls-rsvp-multicast-00.txt, Internet Draft, Jun. 2002, 37 pages.

Aggarwal et al., Establishing Point to Multipoint MPLS TE LSPs, draft-raggarwa-mpls-p2mp-te-02.txt, Network Working Group, Internet Draft, Jan. 2004, 16 pages.

Aggarwal et al., Establishing Point to Multipoint MPLS TE LSPs, draft-raggarwa-mpls-p2mp-te-01.txt, Network Working Group, Internet Draft, Jan. 2004, 33 pages.

Aggarwal et al., Establishing Point to Multipoint MPLS TE LSPs, draft-raggarwa-mpls-p2mp-te-00.txt, Network Working Group, Internet Draft, May 2003, 11 pages.

Awduche, D., et al., "RSVP-TE: Extensions to RSVP for LSP Tunnels," Network Working Group, RFC3209, http://rfc309.x42.com/ printed Oct. 10, 2003, 58 pgs.

Brittain, Paul, et al., "MPLS Traffic Engineering: A Choice of Signaling Protocols," Data Connection Limited, United Kingdom, http://www.dataconnection.com, Jan. 17, 2000, pp. i-30.

Cisco, IOS Release 12.0(5)S, Multiprotocol Label Switching (MPLS) Traffic Engineering, pp. 1-80, 1999.

Yasukawa, Seisho, et al., "Extended RSVP-TE for Multicast LSP Tunnels," Internet Draft, Nov. 2002, pp. 1-46.

Notice of Allowance for U.S. Appl. No. 11/045,196, mailed Sep. 8, 2008, 6 pages.

Office Action for U.S. Appl. No. 11/045,196, mailed Jan. 23, 2008, 8 pages.

Office Action for U.S. Appl. No. 11/045,196, mailed Mar. 21, 2008, 18 pages.

Final Office Action for U.S. Appl. No. 12/341,842, mailed Mar. 1, 2011, 22 pages.

Office Action for U.S. Appl. No. 12/341,842, mailed Sep. 13, 2010, 17 pages.

Final Office Action for U.S. Appl. No. 12/341,842, mailed Jul. 5, 2011, 21 pages.

MPLS TRAFFIC ENGINEERING FOR POINT-TO-MULTIPOINT LABEL SWITCHED PATHS

CROSS REFERENCE TO RELATED APPLICATIONS

This application is a continuation of application Ser. No. 12/341,842, filed Dec. 22, 2008, which is a continuation of application Ser. No. 11/045,196, filed Jan. 27, 2005, which claims priority to U.S. Provisional Application Ser. No. 60/541,892, filed Feb. 3, 2004, which are hereby incorporated by reference.

BACKGROUND OF THE INVENTION

1. Field of the Invention

The invention relates to the field of communication. More specifically, the invention relates to providing point-to-multipoint label switch paths (LSPs) in a Multi-Protocol Label Switching (MPLS) network.

2. Background of the Invention

The multi-protocol label switching (MPLS) protocol may be categorized as a network layer protocol of the Open Standards Institute (OSI) reference model. MPLS provides a method for generically tunneling data through networks with label switched paths (LSPs). MPLS forwards data using labels that are attached to each data packet. These labels are distributed between the nodes that comprise the network.

Extended Resource Reservation Protocol referred to as RSVP Traffic Engineering (RSVP-TE) may be used as a signaling protocol to establish LSPs in the MPLS network. Generic RSVP uses a message exchange to reserve resources across a network for IP flows. RSVP-TE enhances generic RSVP so that it can be used to distribute MPLS labels and to establish traffic engineered (TE) LSPs that can be automatically routed away from network failures, congestion and bottlenecks and satisfy various other policies related to network performance optimization. TE LSPs typically carry a set of flows aggregated by their service class.

While RSVP-TE defines a mechanism for setting up point-to-point (P2P) TE LSPs, it does not provide a mechanism for building point-to-multipoint (P2MP) TE LSPs. A P2MP LSP is a label switched path that has one unique ingress label switching router (LSR) and multiple egress LSRs.

P2MP technology becomes increasingly important with the growing popularity of real-time applications such as content delivery services and video conferences that require P2MP real-time transmission capability with much more bandwidth and stricter quality of service (QoS) than non-real-time applications.

Seisho Yasukawa and Allan Kullberg have recently proposed protocol extensions to RSVP-TE for P2MP MPLS in the publication entitled "Extended RSVP-TE for Point-to-Multipoint LSP Tunnels." The proposed protocol extensions provide for signaling the P2MP LSP using a tree explicit route object that describes the P2MP tree topology. The P2MP tree is calculated and signaled as the tree explicit route object all LSRs participating in a session. If a new receiver is added to the session or an existing receiver is removed from the session, the whole tree is recomputed, an old tree is deleted, and the recomputed tree is signaled to the participating LSRs.

The approach of Yasukawa, et al., has a number of limitations. Specifically, in a large network, receivers are typically added to the session and removed from the session rather frequently. Each time such a change happens, the P2MP tree has to be recomputed and re-distributed to the participating nodes, thus creating a significant overhead.

In addition, if the use of a new P2MP tree begins before all copies of an old P2MP are deleted, a race condition may occur in the MPLS network. RSVP-TE does not provide support for resolving a race condition caused by the existence of the two trees in the network. Hence, an additional mechanism is needed to address such race conditions.

Further, this approach significantly increases the size of messages exchanged by the LSRs in the MPLS network because the P2MP tree has to be sent to each LSR along the P2MP LSP.

BRIEF SUMMARY OF THE INVENTION

A method and apparatus for providing point-to-multipoint label switch paths (LSPs) in a Multi-Protocol Label Switching (MPLS) network is described.

According to one aspect of the invention, a point-to-multipoint LSP is built in a MPLS network by using Resource Reservation Protocol Traffic Engineering (RSVP-TE) to signal the point-to-multipoint LSP as separate point-to-point LSPs and to merge the separate point-to-point LSPs into the point-to-multipoint LSP.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention.

However, it is understood that the invention may be practiced without these specific details. In other instances, well-known circuits, structures, standards, and techniques have not been shown in detail in order not to obscure the invention.

A method and apparatus for providing point-to-multipoint (P2MP) label switch paths (LSPs) in a Multi-Protocol Label Switching (MPLS) network is described. In one embodiment, extended Resource Reservation Protocol known as RSVP Traffic Engineering (RSVP-TE) is used to signal a P2MP LSP as separate point-to-point (P2P) LSPs associated with multiple receivers participating in a session. The separate P2P LSPs are then merged into a P2MP LSP using RSVP semantics. In one embodiment, each P2MP LSP is associated with a unique identifier that is used to recognize all the P2P LSPs belonging to the same P2MP LSP.

Figure 1:
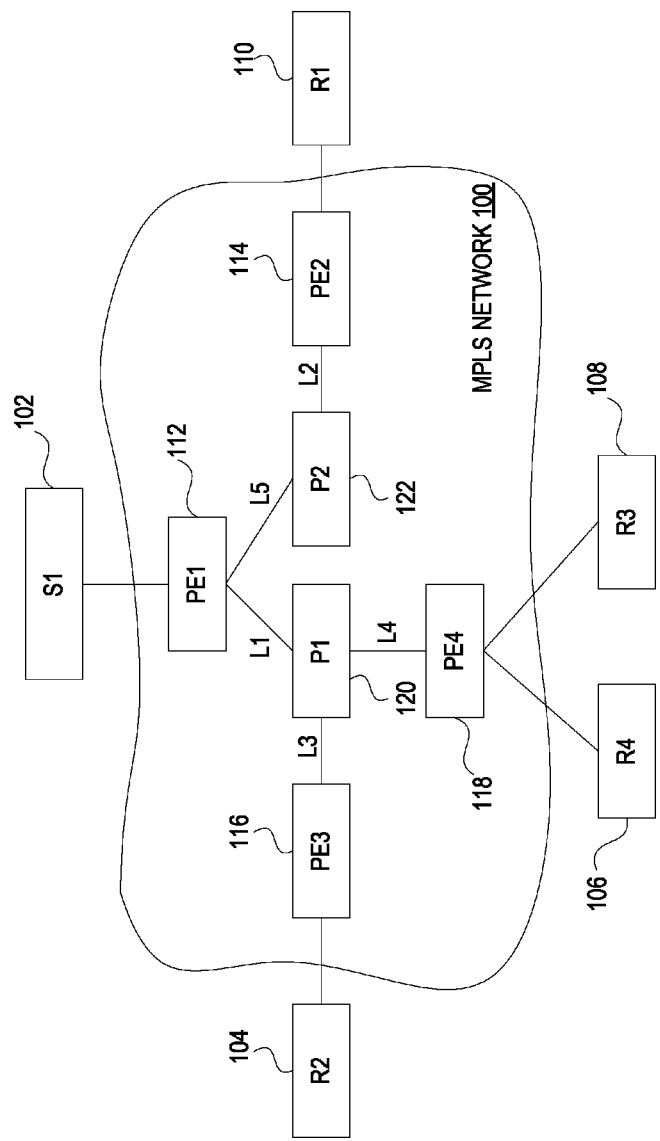
FIG. 1 is a block diagram of an exemplary MPLS network in which embodiments of the present invention can operate.

FIG. 1 is a block diagram of an exemplary MPLS network in which embodiments of the present invention can operate.

Referring to FIG. 1, an MPLS network includes a set of label-switched routers (LSRs) consisting of edge routers (e.g., PE1 112 through PE4 118) and core routers (e.g., P1 120 and P2 122). An edge router forwards packets between an external device and the MPLS network 100. A core router forwards packets to LSRs within the MPLS network 100.

As shown in FIG. 1, the edge router 112 receives packets from a source 102. Each packet received from the source 102 is replicated within the MPLS network 100 and sent to each of the receivers 104 through 110. The source 102 and each of the receivers 104 through 110 may be any device and/or network connected to the MPLS network 100.

The packets are replicated based on a P2MP LSP that is established from the source 102 to the receivers 104, 106, 108 and 110. The P2MP LSP is established using RSVP-TE. As discussed above, RSVP is a signaling protocol that uses a message exchange to reserve resources across a network for IP flows. RSVP-TE enhances generic RSVP so that is can be used to distribute MPLS labels and to establish traffic engineered (TE) LSPs that can be automatically routed away from network failures, congestion and bottlenecks and satisfy various other policies related to network performance optimization. RSVP-TE defines a mechanism for setting up point-to-point (P2P) LSPs using PATH and RESV messages. In one embodiment, this mechanism is used to build multiple P2P LSPs for the receivers 104, 106, 108 and 110. The multiple P2P LSPs are then merged into a P2MP LSP based on a mechanism for merging unicast paths that is supported by generic RSVP.

In one embodiment, each created P2MP LSP is assigned a unique identifier that is included in every PATH or RESV message exchanged by the nodes of the MPLS network 100. Hence, P2P LSPs belonging to the same P2MP LSP can share network resources.

In one embodiment, each node in the MPLS network 100, that receives PATH and RESV messages associated with the P2MP LSP, creates a multicast label mapping for a portion of the P2MP LSP that covers this node. A multicast label mapping identifies an incoming label and one or more outgoing labels for the node. For example, a multicast label mapping of the core router 120 may be expressed as (L1=>{L3, L4}).

In one embodiment, the establishment of the P2P LSPs is initiated by an edge router 112 connected to the source 102. The edge router 112 is referred to herein as a source edge router, and edge routers 114, 116 and 118 that are connected to the receivers 104 through 110 are referred to herein as receiver edge routers. In this embodiment, the source edge router 112 computes a P2P LSP to each of the receiver edge routers 114, 116 and 118 and sends separate PATH messages identifying corresponding P2P LSPs to the core routers 120 and 122. In one embodiment, each PATH message contains a unique identifier of the P2MP LSP to which the P2P LSPs belong.

The core router 120 processes the PATH message and forwards two separate PATH messages to the receiver edge routers 116 and 118. The first PATH message identifies a route from the core router 120 to the receiver edge router 116 and the second PATH message identifies a route from the core router 120 to the receiver edge router 118. Similarly, the core router 122 forwards a PATH message to the receiver edge router 114.

The receiver edge routers 114, 116 and 118 respond with RESV messages that include labels allocated by the receiver edge routers. The core router 120 receives RESV messages from the receiver edge routers 116 and 118 with labels L3 and L4 respectively, allocates a new label L1, creates a multicast mapping of (L1=>{L3, L4}), and forwards an RESV message with label L1 to the source edge router 112. In one embodiment, the core router 120 forwards a separate RESV message in response to each received RESV.

The core router 122 receives an RESV message from the receiver edge router 114 with label L2, creates a new label L5, creates a multicast mapping of (L5=>{L2}), and forwards an RESV message with label L5 to the source edge router 112.

The source edge router 112 receives RESV messages from core routers 120 and 122 and populates an Forwarding Equivalence Class (FEC) table (e.g., using a designated non-RSVP mechanism) with a mapping of (Destination IP Address=>{L1, L5}).

In another embodiment, the establishment of the P2P LSPs is initiated by receiver edge routers 114, 116 and 118. In particular, each of the receiver edge routers 114, 116 and 118 computes a P2P LSP with the source edge router 112 as a destination and sends a PATH message identifying a corresponding P2P LSP and a suggested label. In one embodiment, each PATH message contains a unique identifier of the P2MP LSP to which the P2P LSPs belong.

The router 120 receives PATH messages from the receiver edge routers 116 and 118, assigns a suggested label L1 to each of them, and forwards two separate PATH messages to the source edge router 112. The core router 122 receives a PATH message from the receiver edge router 114 and forwards it to the source edge router 112.

The source edge router 112 creates a multicast label mapping of ({L1, L2}) and sends RESV messages to the core routers 120 and 122. In one embodiment, the source edge router 112 sends a separate RESV message in response to each PATH message received from the core router 120. In another embodiment, the source edge router 112 sends a single RESV message in response to both PATH messages received from the core router 120.

Once the core routers 120 and 122 receive their RESV messages, they create multicast mappings and send RESV messages to corresponding receiver edge routers 114, 116 and 118 that create their own multicast label mappings.

In both source and receiver edge router initiated embodiments, when a new receiver needs to be added, a P2P LSP is established for the new receiver and the established P2P LSP is then merged with the existing P2P LSPs in the P2MP LSP using the RSVP mechanism for merging unicast paths. When an existing receiver needs to be removed, an RSVP PATH TEAR message is used to remove the path to this receiver from the P2MP LSP.

Accordingly, embodiments of the present invention follow existing RSVP-TE procedures with relatively minor enhancements and do not cause a significant increase in the size of messages exchanged between the LSRs.

Figure 2:
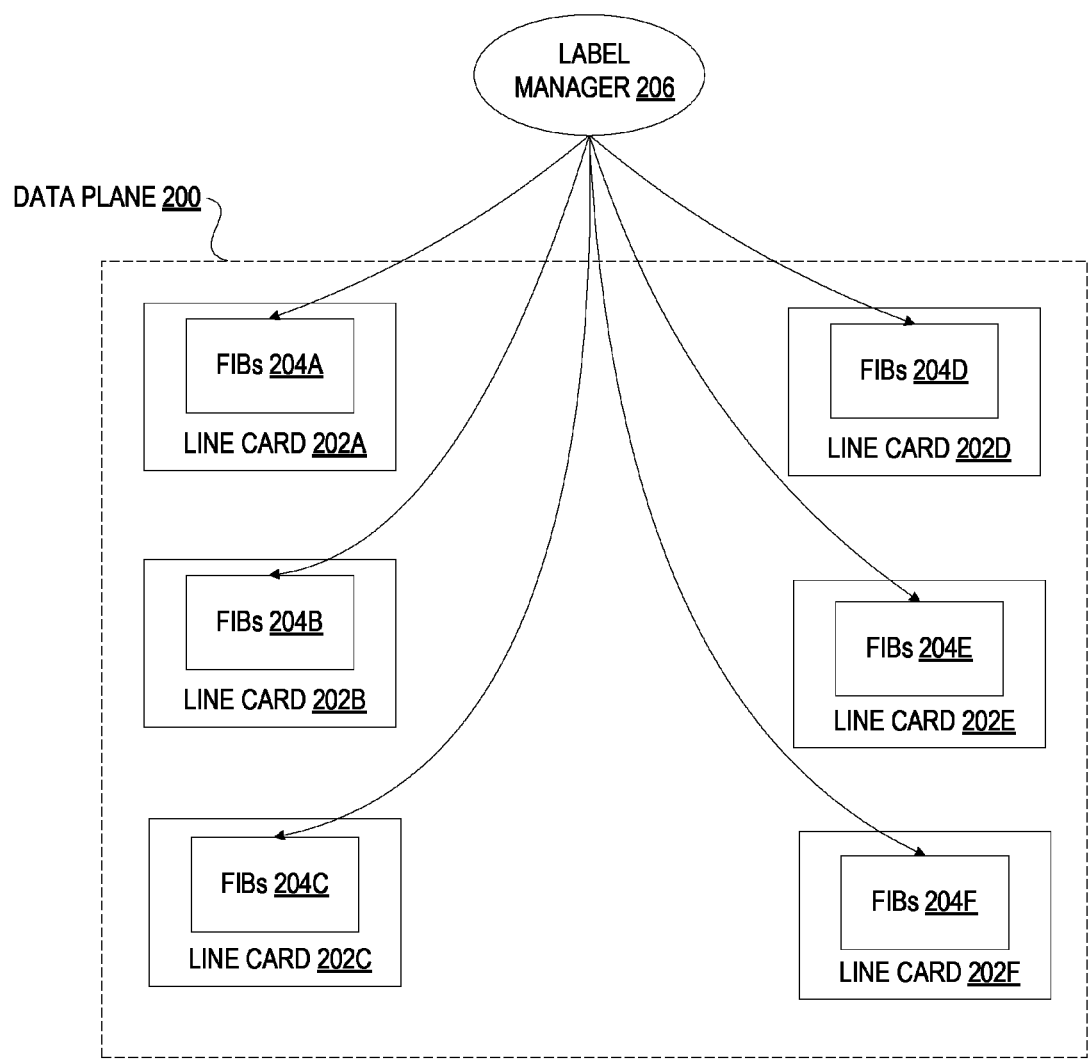
FIG. 2 is a block diagram illustrating an exemplary data plane of a network device, according to one embodiment of the present invention.

FIG. 2 is a block diagram illustrating an exemplary data plane 200 of a network device, according to one embodiment of the present invention. The network device may be any LSR in the MPLS network 100. The data plane 200 includes a number of line cards such as line cards 202A through 202F. The line cards 202A through 202F host forwarding information bases (FIBs) 204A through 204F respectively. The FIBs 204A through 204F contain multicast label mappings for different P2MP LSPs passing through the line cards 202A through 202F. The multicast label mappings are created by a label manager 206 using labels included in the RSVP-TE signaling messages exchanged between this network device and other network devices in the MPLS network 100, as discussed in more detail above. The label manager 206 resides on the control plane of the network device. In one embodiment, the label manager 206 is a component of an RSVP module, as will be discussed in greater detail below. Multicast label mappings may be stored using various formats (e.g., as a table, as a balanced hash-based tree with a linked list of nodes to store multiple labels when necessary, etc.).

The multicast forwarding mappings are used by an MPLS forwarding module to identify interfaces to which every incoming packet needs to be sent and labels to be included in these packets.

While FIG. 2 shows one exemplary embodiment of the data plane, alternative embodiments may be implemented differently (e.g., with more line cards, less line cards, or a single line card).

Figure 3:
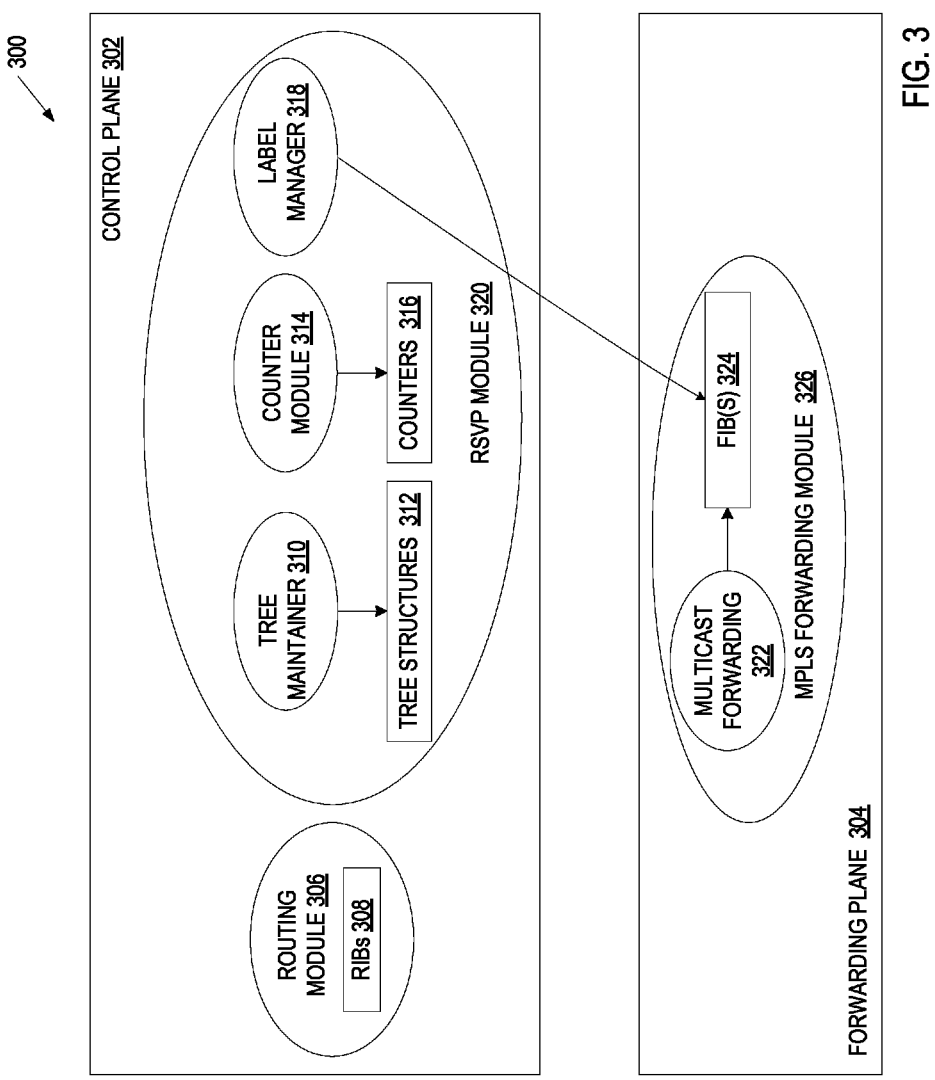
FIG. 3 is a block diagram of an exemplary edge router according to one embodiment of the present invention.

FIG. 3 is a block diagram of an exemplary edge router 300 according to one embodiment of the present invention.

Referring to FIG. 3, the control plane 302 of the edge router 300 hosts a routing module 306 and an RSVP module 320. The routing module 306 is responsible for computing a separate P2P LSP for each receiver participating in a session, for associating each P2P LSP with the unique ID of the P2MP LSP to which the P2P LSP belongs, and for storing the computed P2P LSPs in one or more routing information bases (RIBs) 308. In one embodiment, the routing module 306 calculates the P2P LSPs of the same P2MP LSP so that they can share resources (e.g., links, QoS, etc.) where possible. These calculations may be performed using IP routing protocols with TE extensions, such as Intermediate System to Intermediate System Traffic Engineering (ISIS-TE), Open Shortest Path First Traffic Engineering (OSPF-TE), etc.

The RSVP module 320 may include a tree maintainer 310, a counter module 314, and a label manager 318 (such as a label manager 206 of FIG. 2). The tree maintainer 310 is responsible for merging the separate P2P LSPs computed by the routing module 306 into a P2MP LSP using the RSVP mechanism to merge unicast paths and for updating the P2MP LSP when a new receiver joins the session or an existing receiver is removed from the session, as will be discussed in more detail below. Various formats may be used to store information about P2MP LSPs created by the tree maintainer 310. For example, each P2MP LSP can be stored as a tree data structure 312.

The counter module 314 is responsible for maintaining a path counter 316 for each P2MP LSP. A path counter 316 specifies the number of P2P LSPs in the P2MP LSP. The counter module 314 increments the path counter each time a new P2P LSP is established for the P2MP LSP. Similarly, the path counter is decremented each time an existing P2P LSP is removed from the P2MP LSP.

The label manager 318 is responsible for creating a multicast label mapping for each P2MP LSP initiating from the edge router 300 based on labels specified in the signaling messages exchanged between the edge router 300 and the other nodes along the P2MP LSP.

The forwarding plane 304 may exist on multiple line cards of the network device 300. The forwarding plane 304 hosts an MPLS forwarding module 326 that may include a multicast forwarding 322 and FIBs 324. FIBs 324 store multicast label mappings generated by the label manager 318. The multicast forwarding 322 is responsible for determining one or more interfaces to which each incoming packet is to be sent. In one embodiment, the multicast forwarding 322 makes this determination using multicast label mapping information in the FIBs 324. If the packet needs to be sent out on multiple interfaces, the multicast forwarding 322 replicates the packet as needed, includes a corresponding label specified by the multicast label mapping in each replicated packet, and sends each replicated packet to the appropriate interface.

While FIG. 3 shows one exemplary embodiment of the edge router, alternative embodiments may be implemented differently (e.g., having a different configuration, more or less modules or data structures, etc.).

Figure 4:
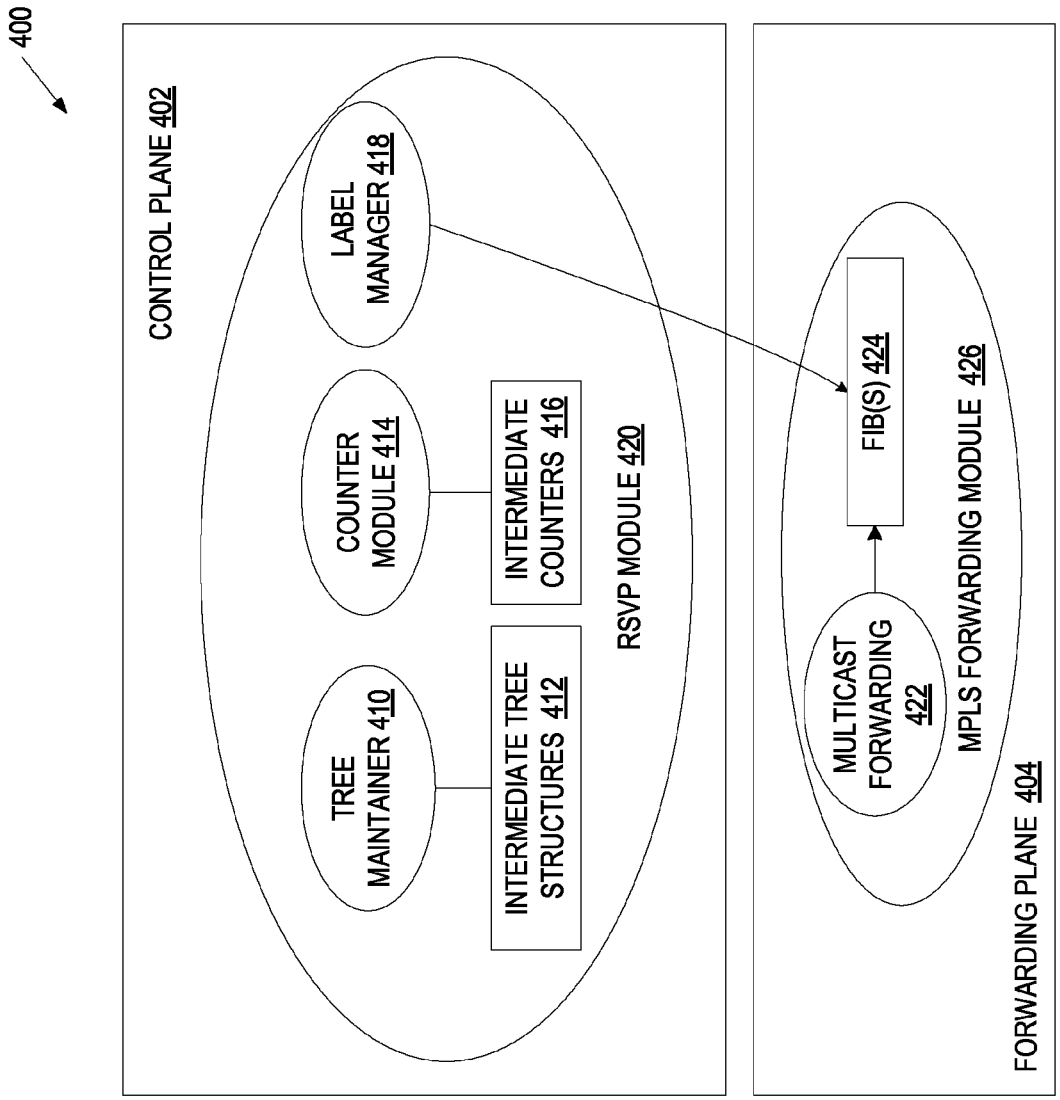
FIG. 4 is a block diagram of an exemplary core router according to one embodiment of the present invention.

FIG. 4 is a block diagram of an exemplary core router 400 according to one embodiment of the present invention.

Referring to FIG. 4, the control plane 402 of the core router 400 hosts an RSVP module 420 that may include a tree maintainer 410, a counter module 414, and a label manager 418. The tree maintainer 410 is responsible for merging the portions of P2P LSPs that cover routes from the core router 400 to one or more receivers that belong to the same P2MP LSP. The merge is performed using the RSVP unicast path merge mechanism. The merge results in a partial (or intermediate) P2MP LSP. The tree maintainer 410 updates the partial P2MP LSP each time a new route from the core router 400 to a new receiver needs to be added or an existing route from the core router 400 to an existing receiver needs to be removed. A partial P2MP LSP may be stored using various formats. For example, a partial P2MP LSP may be stored as a tree (e.g., an intermediate tree data structure 412 in FIG. 4).

The counter module 414 is responsible for maintaining a path counter 416 for each partial P2MP LSP identified in the data structures 412. A path counter 416 specifies the number of routes in the partial P2MP LSP. The counter module 414 increments the path counter 416 each time a new route is added to the partial P2MP LSP. Similarly, the path counter 416 is decremented each time an existing route is removed from the partial P2MP LSP.

The label manager 418 is responsible for creating a multicast label mapping for each partial P2MP LSP maintained in the core router 400 based on labels specified in the signaling messages exchanged between the core router 400 and other nodes along the partial P2MP LSP.

The forwarding plane 404 hosts an MPLS forwarding module 426 that may include a multicast forwarding 422 and FIB(s) 424 that operates similarly to the MPLS forwarding module 326 discussed above in conjunction with FIG. 3.

While FIG. 4 shows one exemplary embodiment of the core router, alternative embodiments may be implemented differently (e.g., having a different configuration, more or less modules or data structures, etc.).

Figure 5A:
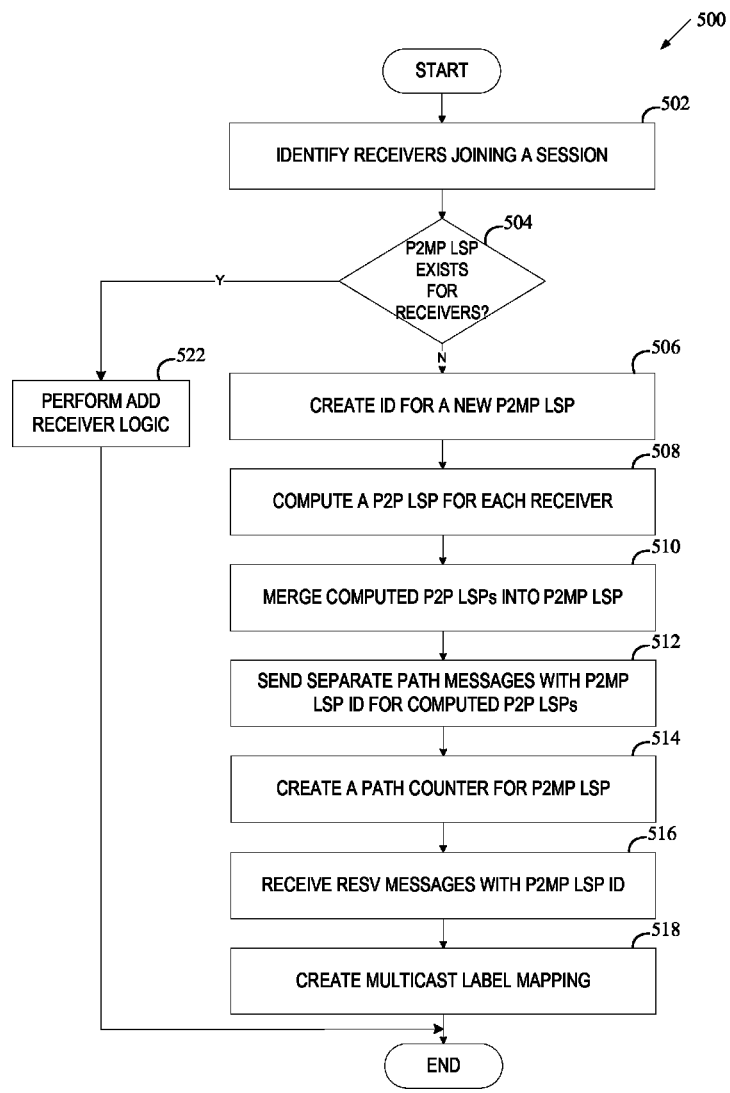
FIG. 5A is a flow diagram of one embodiment of a source edge router initiated process for building a P2MP LSP.
Figure 6:
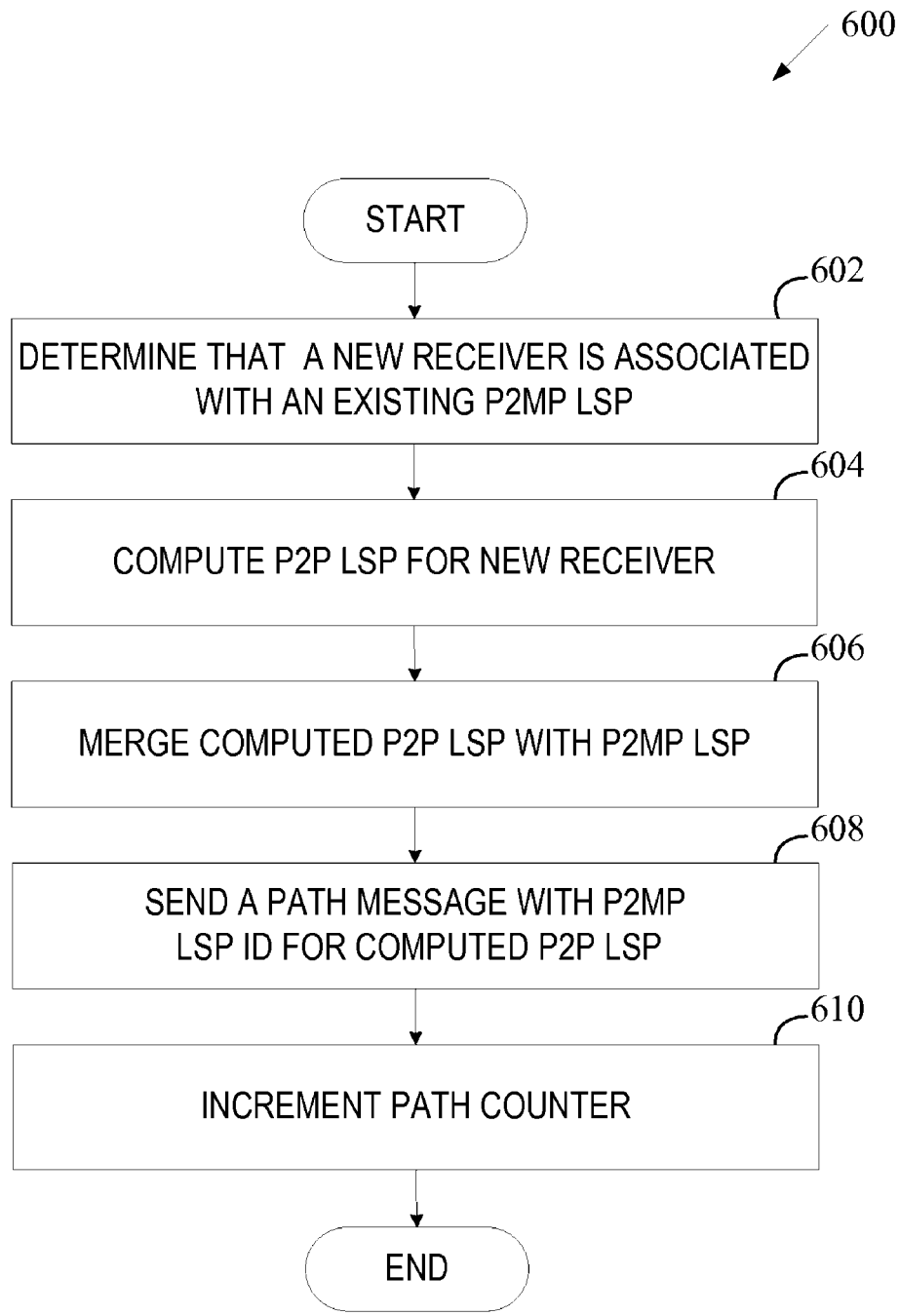
FIG. 6 is a flow diagram of one embodiment of a source edge router initiated process for adding a new receiver to a P2MP LSP.
Figure 7:
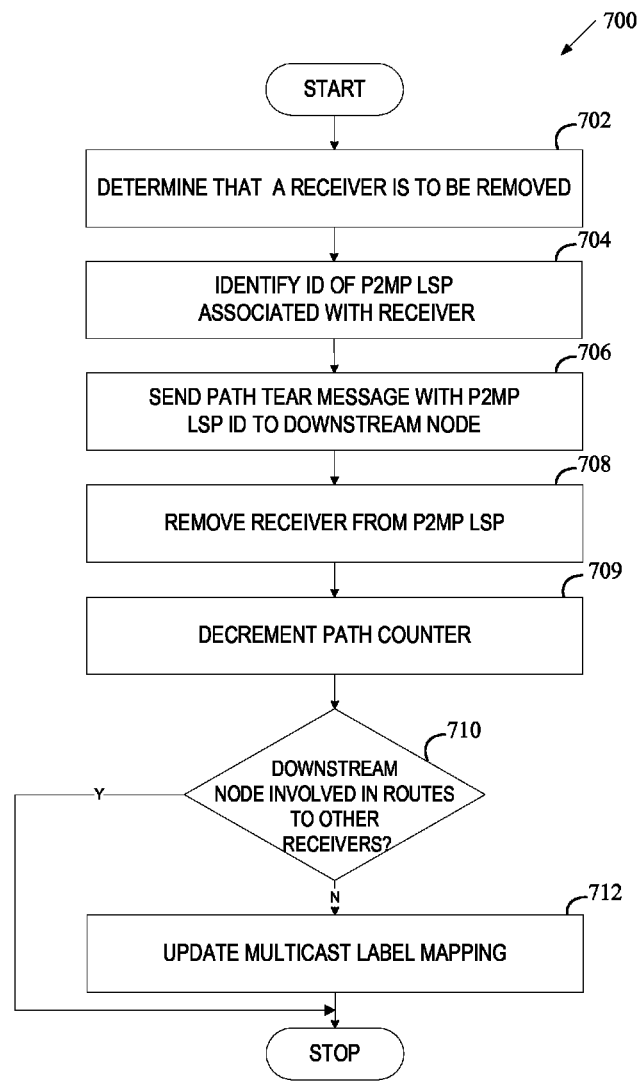
FIG. 7 is a flow diagram of one embodiment of a source edge router initiated process for removing a receiver from a P2MP LSP.

FIGS. 5A, 6 and 7 are flow diagrams of source edge router initiated processes performed by a source edge router according to various embodiments of the present invention. The process may be performed by processing logic that may comprise hardware (e.g., circuitry, dedicated logic, programmable logic, microcode, etc.), software (such as run on a general purpose computer system or a dedicated machine), or a combination of both.

FIG. 5A is a flow diagram of one embodiment of a process 500 for building a P2MP LSP. Process 500 begins with processing logic identifying receivers that are joining the session (processing block 502). The identification may be performed using various means (e.g., by a protocol at the application level, by Protocol Independent Multicast (PIM) running by the Internet Service Provider, etc.).

Figure 5B:
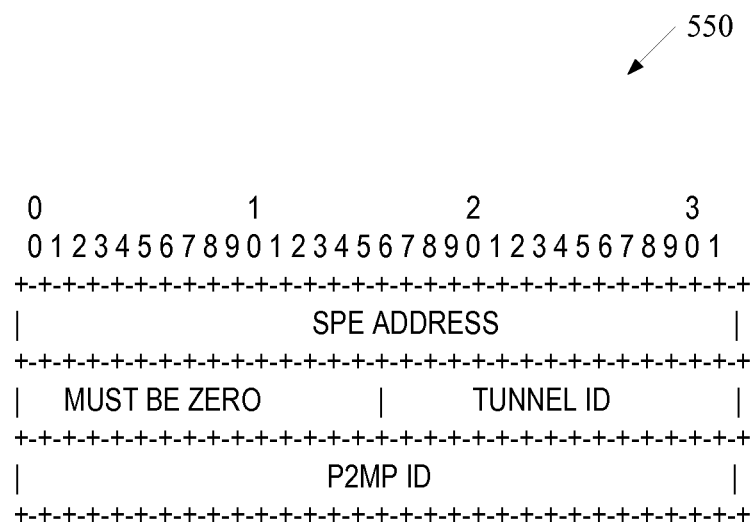
FIG. 5B illustrates the format of an exemplary P2MP LSP session object.

Next, processing logic determines whether the identified receivers belong to an existing P2MP LSP (decision box 504). In one embodiment, the determination is made by searching the identifiers of existing P2MP LSPs (P2MP LSP ID). In one embodiment, each P2MP LSP ID is composed of a unique combination of the address of a source edge router initiating the P2MP LSP, a tunnel ID that identifies the type of the traffic (e.g., video, voice, etc.) traveling along the P2MP LSP, and the identifier of the session. In one embodiment, a new P2MP LSP session RSVP-TE object is introduced to carry the elements of the P2MP LSP ID. FIG. 5B illustrates the format of an exemplary P2MP LSP session object 550, which contains the address of the source edge router (e.g., a 32-bit IPv4 (Internet Protocol version 4) address), the tunnel ID is a 16-bit identifier and the P2MP ID is a 32-bit identifier.

In one embodiment, a P2MP LSP session object is included in all signaling messages exchanged between the nodes of the MPLS network.

Referring again to FIG. 5A, if the determination made at processing block 504 is positive, processing logic performs an add receiver process 522 discussed in more detail below in conjunction with FIG. 6. Otherwise process 500 flows to processing block 506, at which processing logic creates a unique identifier for a new P2MP LSP (processing block 506). In one embodiment, the P2MP LSP ID is created as a P2MP LSP session object discussed above.

At processing block 508, processing logic computes a P2P LSP for each receiver identified at processing block 502. In one embodiment, the P2P LSPs are computed to share network resources where possible as discussed in more detail above.

At processing block 510, processing logic merges the computed P2P LSPs into a P2MP LSP with the ID created at processing block 506. As discussed above, the P2MP LSP may be stored as a tree or any other data structure.

At processing block 512, processing logic sends a separate PATH message for each computed P2P LSP to a corresponding downstream node.

At processing block 514, processing logic creates a path counter that specifies the number of P2P LSP in the P2MP LSP.

Further, processing logic receives RESV messages with the P2MP LSP ID (processing block 516) and creates a multicast label mapping based on the labels specified in the RESV messages (processing block 518). In one embodiment, processing logic receives a separate RESV message in response to each PATH message it previously sent unless an error has occurred (e.g., if a downstream node is down, etc.). In this embodiment, if the number of received RESV messages is lower than the number of previously sent PATH messages, then processing logic updates the P2MP LSP to remove the P2P LSPs for which RESV messages were not received. In addition, processing logic decrements the path counter by the number of missing RESV messages.

FIG. 6 is a flow diagram of one embodiment of a process 600 for adding a new receiver to a P2MP LSP. Process 600 begins with processing logic determining that the new receiver belongs to an existing P2MP LSP (decision box 602). As discussed above, in one embodiment, the determination is made by searching the identifiers of existing P2MP LSPs (P2MP LSP ID).

At processing block 604, processing logic computes a P2P LSP to reach the new receiver. As discussed above, in one embodiment, the P2P LSP is computed to share resources with other P2P LSPs that belong to the same P2MP LSP.

At processing block 606, processing logic merges the computed P2P LSP with the other P2P LSPs of the P2MP LSP.

At processing block 608, processing logic sends a PATH message for the computed P2P LSP to a corresponding downstream node.

At processing block 610, processing logic increments the path counter associated with the P2MP LSP.

Further, in one embodiment, processing logic is supposed to receive a matching RESV message unless an error has occurred (e.g., if a downstream node is down, etc.). Then, if the matching RESV message is received, processing logic determines whether the label specified in the matching RESV message is already included in the multicast label mapping for the P2MP LSP. If not, processing logic updates the multicast label mapping to include this new label. If processing logic does not receive a matching RESV message, processing logic updates the P2MP LSP to remove the newly-added P2P LSP and decrements the path counter.

FIG. 7 is a flow diagram of one embodiment of a process 700 for removing a receiver from a P2MP LSP. Process 700 begins with processing logic determining that a receiver is to be removed from a session (processing block 702). The identification may be performed using various means (e.g., by a protocol at the application level, by Protocol Independent Multicast (PIM) running by the Internet Service Provider, etc.).

Next, processing logic determines the identifier of the P2MP LSP to which the receiver belongs (processing block 704). In one embodiment, the determination is made by searching identifiers of existing P2MP LSP IDs for the receiver's identifying information (e.g., the address of the source edge router, the tunnel ID and the identifier of the session).

At processing block 706, processing logic sends a PATH TEAR message identifying the path to the receiver being removed and the P2MP LSP ID. In one embodiment, the PATH TEAR message includes a P2MP LSP session object with the P2MP LSP ID. In one embodiment, if more than one receiver needs to be removed, processing logic sends a separate PATH TEAR message for each of these receivers.

At processing block 708, processing logic removes the path to this receiver from the P2MP LSP by updating the internal data structures, for example, by removing the receiver from a tree data structure.

At processing block 709, processing logic decrements the path counter associated with the P2MP LSP.

At decision box 710, processing logic determines whether an immediate downstream node is only involved in the route to the receiver being removed. If so, processing logic updates the multicast label mapping to remove the label associated with this downstream node (processing block 712).

Figure 8:
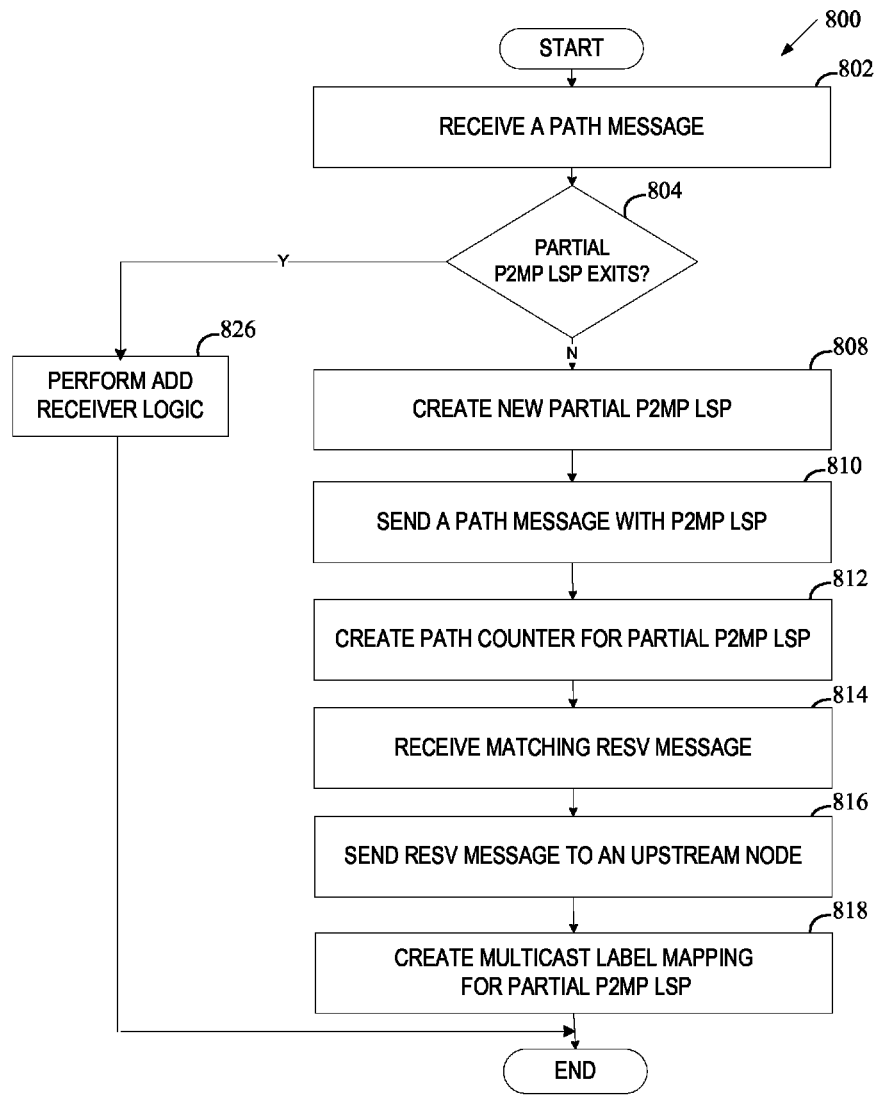
FIG. 8 is a flow diagram of one embodiment of a process for building a partial P2MP LSP.
Figure 9:
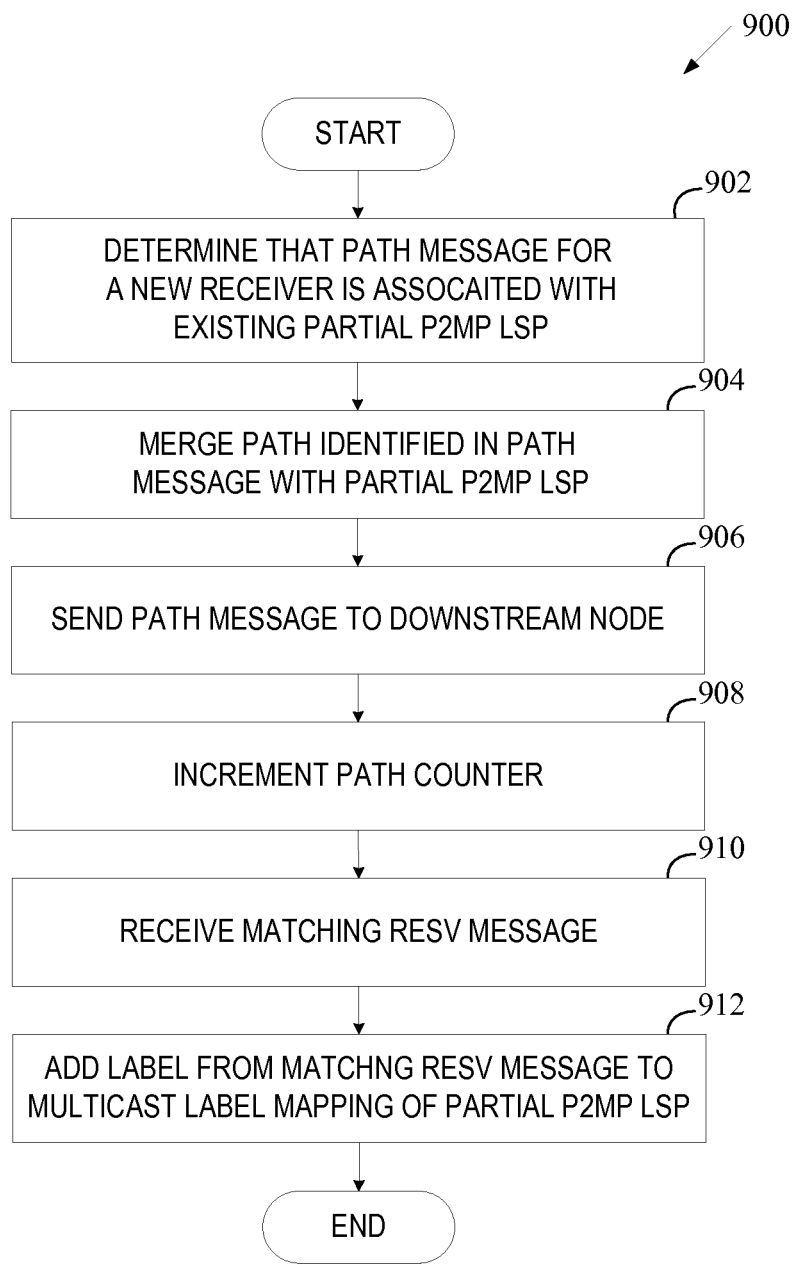
FIG. 9 is a flow diagram of one embodiment of a process for adding a path to a partial P2MP LSP.
Figure 10:
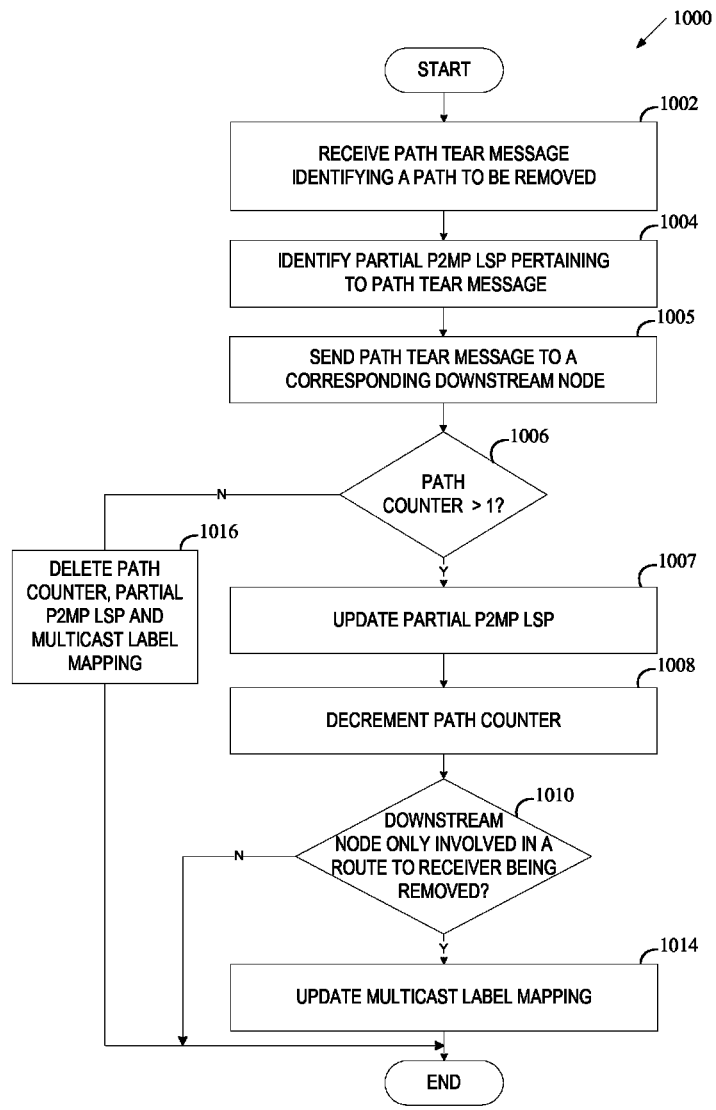
FIG. 10 is a flow diagram of one embodiment of a process for removing a path from a partial P2MP LSP.

FIGS. 8-10 are flow diagrams of processes performed by a core router according to various embodiments of the present invention. The process may be performed by processing logic that may comprise hardware (e.g., circuitry, dedicated logic, programmable logic, microcode, etc.), software (such as run on a general purpose computer system or a dedicated machine), or a combination of both.

FIG. 8 is a flow diagram of one embodiment of a process 800 for building a partial P2MP LSP. Process 800 begins with processing logic receiving a PATH message (processing block 802). The PATH message may be received from a source edge router or another core router.

At decision box 804, processing logic determines whether the PATH message is associated with an existing partial P2MP LSP using the P2MP LSP ID included in the PATH message. If so, an add receiver process 826 is performed that will be discussed in more detail in conjunction with FIG. 9.

If an existing partial P2MP LSP does not exist, processing logic creates a new partial P2MP LSP based on the route specified in the PATH message (processing block 808), sends a PATH messages to a downstream node identified in the received PATH message (processing block 810), and creates an intermediate path counter for the partial P2MP LSP (processing block 812). The intermediate path counter specifies the number of unicast paths in the partial P2MP LSP. In one embodiment, processing logic stores the partial P2MP LSP using a specific data structure (e.g., as a tree referred to herein as an intermediate tree).

Further, processing logic receives a matching RESV message (processing block 814), forwards the RESV message to an upstream node (processing block 816), and creates a multicast label mapping for the partial P2MP LSP (processing block 818).

FIG. 9 is a flow diagram of one embodiment of a process 900 for adding a path to a partial P2MP LSP. Process 900 begins with processing logic receiving a PATH message and determining that the PATH message is associated with an existing partial P2MP LSP using the P2MP LSP ID included in the PATH message (processing block 902).

At processing block 904, processing logic merges the path identified in the PATH messages with the other unicast paths in the existing partial P2MP LSP.

Next, processing logic sends a PATH messages to a downstream node identified in the received PATH message (processing block 906) and increments an intermediate path counter associated with the partial P2MP LSP (processing block 908).

Further, processing logic receives a matching RESV message (processing block 910) and updates a multicast label mapping of the partial P2MP LSP to include a new label that is specified in the received RESV message (processing block 912).

Afterwards, in one embodiment, processing logic sends a RESV message to an upstream node in response to receiving the RESV from the downstream node.

FIG. 10 is a flow diagram of one embodiment of a process 1000 for removing a path from a partial P2MP LSP. Process 1000 begins with processing logic receiving a PATH TEAR message identifying a unicast path to be removed (processing block 1002). In one embodiment, the PATH TEAR message includes an identifier of a corresponding P2MP LSP.

Next, processing logic identifies a partial P2MP LSP associated with the PATH TEAR message using the identifier of the P2MP LSP (processing block 1004) and forwards the PATH TEAR message to a corresponding downstream node (processing block 1005).

At decision box 1006, processing logic determines whether an intermediate path counter associated with the partial P2MP LSP is greater than 1. If the intermediate path counter is equal to 1, then it indicates that the partial P2MP LSP only includes a path to the receiver that is being removed. Hence, processing logic deletes the partial P2MP LSP, as well as the intermediate path counter and the multicast label mapping associated with this partial P2MP LSP (processing block 1016).

If the intermediate path counter is greater than 1, then processing logic removes the unicast path identified in the received PATH TEAR message from the partial P2MP LSP (processing block 1007) and decrements the intermediate path counter (processing block 1008).

Further, processing logic determines whether the downstream node to which the PATH TEAR message is forwarded is only involved in the path to the receiver being removed (decision box 1010). If so, processing logic updates the multicast label mapping to remove the label associated with the downstream node (processing block 1014).

Figure 11:
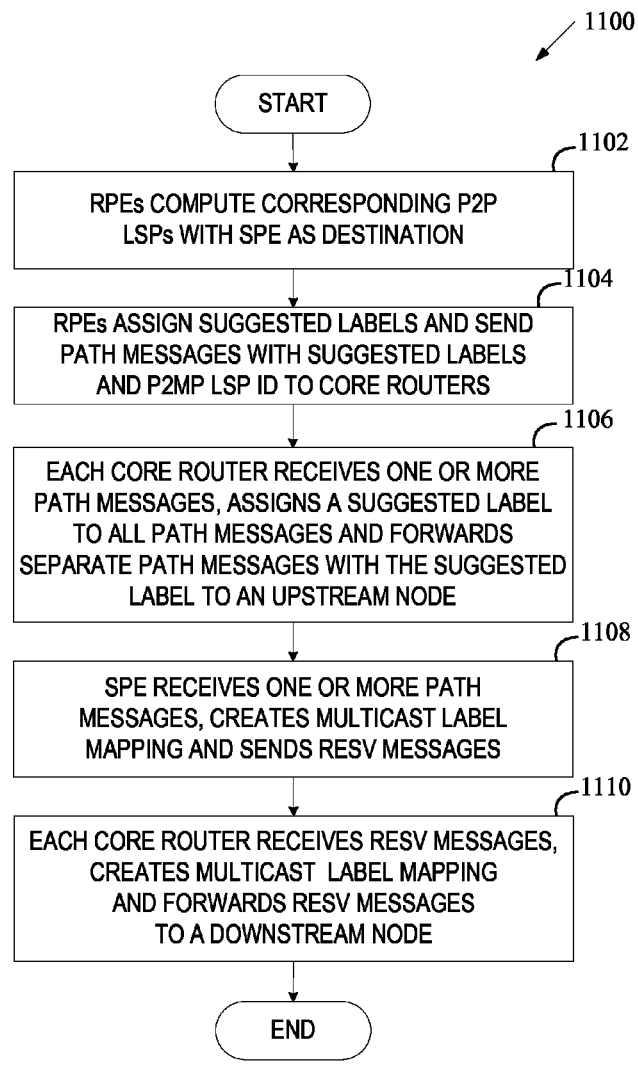
FIG. 11 is a flow diagram of one embodiment of a receiver edge router initiated process for building a P2MP LSP.

FIG. 11 is a flow diagram of one embodiment of a receiver edge router initiated process for establishing a P2MP LSP. The process may be performed by processing logic that may comprise hardware (e.g., circuitry, dedicated logic, programmable logic, microcode, etc.), software (such as run on a general purpose computer system or a dedicated machine), or a combination of both.

Referring to FIG. 11, process 1100 begins with processing logic in each receiver edge router computing a corresponding P2P LSP with a source edge router as a destination (processing block 1102), assigning a suggested label and sending a PATH message with the label and the identifier of the P2MP LSP being built (processing block 1104).

Next, processing logic in each core router along the computed P2P LSPs receives one or more PATH messages, assigns a suggested label to all received PATH messages, and forwards each PATH message with the assigned label to an upstream node (processing block 1106).

Further, processing logic in the source edge router receives the PATH messages from one or more core routers, creates a multicast label mapping for the P2MP LSP, and sends RESV messages matching the PATH messages received (processing block 1108).

Afterwards, processing logic in each core router receives one or more RESV messages, creates a multicast label mapping for the P2MP LSP, and forwards each RESV message to a downstream node (processing block 1110).

Figure 12:
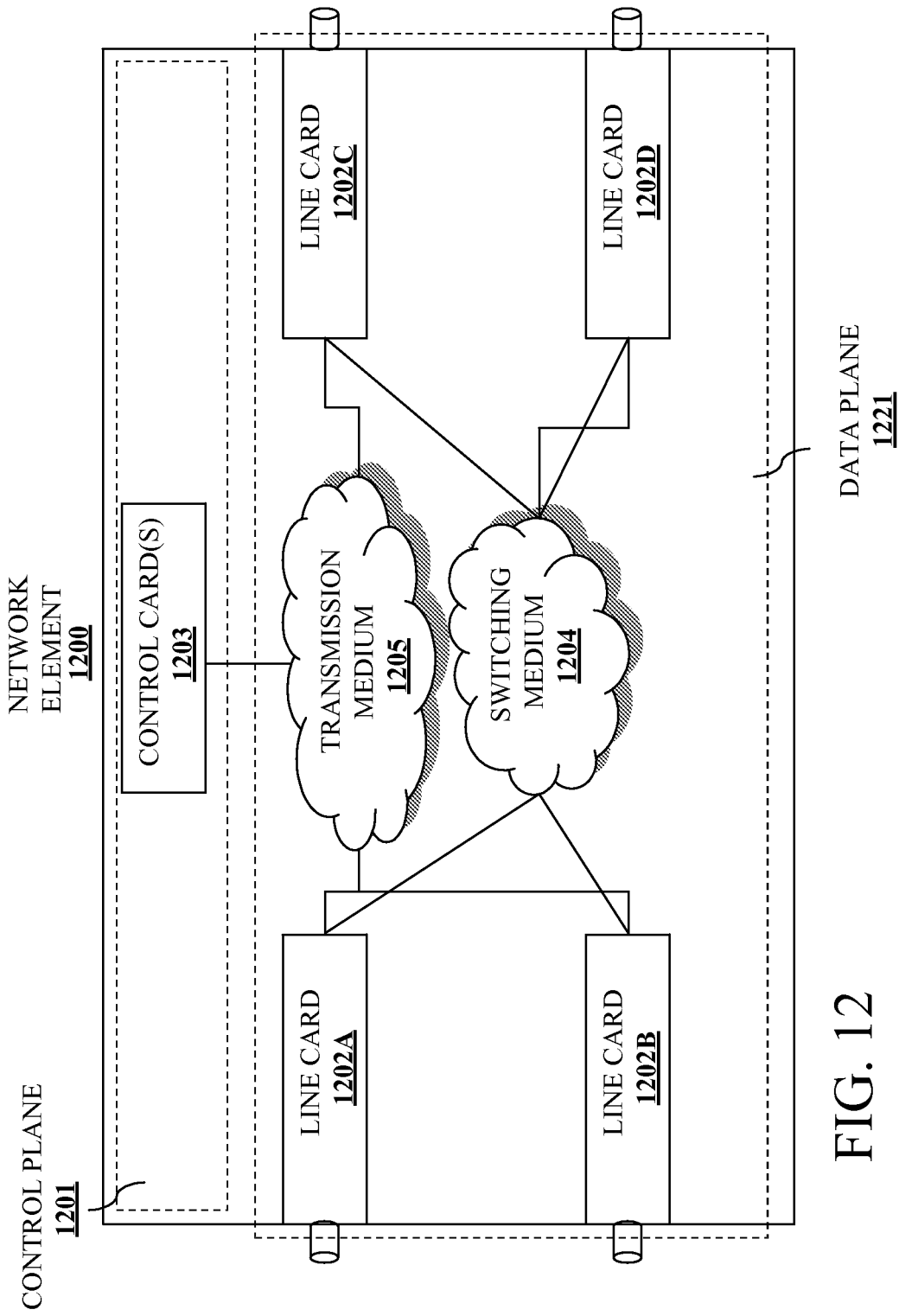
FIG. 12 is a block diagram of an exemplary network element according to one embodiment of the invention.

FIG. 12 is a diagram of an exemplary network element according to one embodiment of the invention. Referring to FIG. 12, the network element 1200 includes a set of control cards 1203 in the control plane 1201. The control card(s) 1203 is coupled with a transmission medium 1205 (e.g., a system bus) in the data plane 1221. The transmission medium 1205 is coupled with the line cards 1202A-1202D. The transmission medium 1205 carries information from the control card(s) 1203 to the line cards 1202A-1202D. The line cards 1202A-1202D are coupled with each other via the switching medium 1204. The switching medium 1204 may be a separate switching unit including hardware and/or software to determine which line card to forward traffic. Alternatively, the switching medium 1204 may be a mesh.

The control card(s) 1203 and the line cards 1202A-1202D illustrated in FIG. 12 include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While FIG. 12 shows one exemplary embodiment of the network element, alternative embodiments may be implemented differently (e.g., having a different configuration, more or less control cards or line cards, etc.).

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A method in a source edge router connected to a source, comprising the steps of:
   identifying a plurality of receivers that are requesting to receive data from the source in a session;
   sending a set of one or more PATH messages to one or more nodes downstream of the source edge router to signal a plurality of separate point-to-point label switched paths (LSPs) between the source edge router and a plurality of receiver edge routers associated with the plurality of receivers, wherein each one of the set of PATH messages includes a same identifier of a point-to-multipoint (P2MP) LSP that includes a session object that contains a tunnel identifier and a P2MP identifier; and
   receiving, from each of the one or more nodes downstream of the source edge router, a set of one or more RESV messages, wherein each one of the received RESV messages includes the identifier of the P2MP LSP and a label allocated by that downstream node that is to be used by the source edge router when sending traffic of the P2MP LSP to that downstream node.

2. The method of claim 1, further comprising the step of:
   creating a mapping of an IP address associated with the P2MP LSP and the one or more labels specified in the set of received RESV messages.

3. The method of claim 2, further comprising the steps of:
   identifying another receiver that is requesting to receive data from the source in the session;
   sending a PATH message to signal a point-to-point LSP for the another receiver, wherein the PATH message includes the identifier of the P2MP LSP;
   receiving a RESV message that includes the identifier of the P2MP LSP and a label;
   responsive to determining that the label specified in the RESV message is not already associated with the P2MP LSP, adding that label to the mapping of the IP address associated with the P2MP LSP.

4. The method of claim 1, further comprising the step of:
   prior to sending the set of PATH messages, computing a separate point-to-point LSP between the source edge router and each of the plurality of receiver edge routers.

5. The method of claim 4, wherein the separate point-to-point LSPs are computed to share resources where possible as determined by an IP routing protocol with Traffic Engineering (TE) extensions.

6. The method of claim 2, further comprising the steps of:
   determining that one of the plurality of receivers is to be removed from the session;
   sending a PATH TEAR message to the one of the set of downstream nodes to reach the receiver that is to be removed from the session, wherein the PATH TEAR message identifies a point-to-point LSP to remove and includes the identifier of the P2MP LSP to cause the point-to-point LSP for the receiver to be removed from the P2MP LSP.

7. The method of claim 6, further comprising the step of:
   responsive to determining that the one of the set of downstream nodes is involved only in a route to the receiver being removed, removing the label allocated by that downstream node from the mapping of the IP address associated with the P2MP LSP.

8. A method in a core router in a Multiprotocol Label Switching (MPLS) network, comprising the steps of:
   receiving a set of one or more first PATH messages from an upstream node, wherein the set of first PATH messages identify at least a portion of a first point-to-point label switched path (LSP) between a source edge router and a first receiver edge router and identify at least a portion of a second point-to-point LSP between the source edge router and a second receiver edge router, wherein the set of first PATH messages each includes a same identifier of a point-to-multipoint (P2MP) LSP that includes a session object that contains a tunnel identifier and a P2MP identifier;
   sending a second PATH message to a first downstream node on the first point-to-point LSP, the second PATH message including the identifier of the P2MP LSP;
   sending a third PATH message to a second downstream node on the second point-to-point LSP, the third PATH message including the identifier of the P2MP LSP;
   receiving, from the first downstream node, a first RESV message responsive to the second PATH message, the first RESV message including the identifier of the P2MP LSP and a first label allocated by the first downstream node;
   receiving, from the second downstream node, a second RESV message responsive to the third PATH message, the second RESV message including the identifier of the P2MP LSP and a second label allocated by the second downstream node;
   allocating a third label to be used by the upstream node when transmitting packets for the P2MP LSP to the core router;
   mapping the third label with the first label and the second label to enable the core router to replicate packets that are received from the upstream node that are labeled with the third label, send each replicated packet to the first downstream node being labeled with the first label, and send each replicated packet to the second downstream node being labeled with the second label; and
   sending a set of one or more third RESV messages to the upstream node responsive to receiving the first RESV message and the second RESV message, wherein the set of third RESV messages each includes the identifier of the P2MP LSP and the third label.

9. The method of claim 8, further comprising the steps of:
   receiving a packet from the upstream node labeled with the third label;
   labeling the packet with the first label;
   sending the packet labeled with the first label to the first downstream node;
   labeling the packet with the second label; and
   sending the packet labeled with the second label to the second downstream node.

10. The method of claim 8, wherein the upstream node is the source edge router attached to a source.

11. The method of claim 8, wherein the upstream node is another core router.

12. The method of claim 8, further comprising the steps of:
    receiving a fourth PATH message from the upstream node, wherein the fourth PATH message identifies at least a portion of a third point-to-point LSP between the source edge router and a third receiver edge router, wherein the fourth PATH message includes the identifier of the P2MP LSP, and wherein a path of the third point-to-point LSP shares a same link between the core router and the first downstream node;

sending a fifth PATH message to the first downstream node, wherein the fifth PATH message includes the identifier of the P2MP LSP;

receiving, from the first downstream node, a fourth RESV message responsive to the fifth PATH message, the fourth RESV message including the identifier of the P2MP LSP and the first label;

sending a fifth RESV message to the upstream node responsive to receiving the fourth RESV message, wherein the fifth RESV message includes the identifier of the P2MP LSP and the third label.

13. An apparatus, comprising:

a set of one or more processors in a source edge router connected to a source;

a non-transitory machine-readable medium that stores instructions that, when executed by the set of processors, cause said processors to perform operations comprising:

identifying a plurality of receivers that are requesting to receive data from the source in a session;

sending a set of one or more PATH messages to one or more nodes downstream of the source edge router to signal a plurality of separate point-to-point label switched paths (LSPs) between the source edge router and a plurality of receiver edge routers associated with the plurality of receivers, wherein each one of the set of PATH messages includes a same identifier of a point-to-multipoint (P2MP) LSP that includes a session object that contains a tunnel identifier and a P2MP identifier; and receiving, from each of the one or more nodes downstream of the source edge router, a set of one or more RESV messages, wherein each one of the received RESV messages includes the identifier of the P2MP LSP and a label allocated by that downstream node that is to be used by the source edge router when sending traffic of the P2MP LSP to that downstream node.

14. The apparatus of claim 13, wherein the non-transitory machine-readable medium further stores instructions that, when executed by the set of processors, cause said set of processors to further perform operations comprising:

creating a mapping of an IP address associated with the P2MP LSP and the one or more labels specified in the set of received RESV messages.

15. The apparatus of claim 14, wherein the non-transitory machine-readable medium further stores instructions that, when executed by the set of processors, cause said set of processors to further perform operations comprising:

identifying another receiver that is requesting to receive data from the source in the session;

sending a PATH message to signal a point-to-point LSP for the another receiver, wherein the PATH message includes the identifier of the P2MP LSP;

receiving a RESV message that includes the identifier of the P2MP LSP and a label;

responsive to determining that the label specified in the RESV message is not already associated with the P2MP LSP, adding that label to the mapping of the IP address associated with the P2MP LSP.

16. The apparatus of claim 13, wherein the non-transitory machine-readable medium further stores instructions that, when executed by the set of processors, cause said set of processors to further perform operations comprising:

prior to sending the set of PATH messages, computing a separate point-to-point LSP between the source edge router and each of the plurality of receiver edge routers.

17. The apparatus of claim 16, wherein the separate point-to-point LSPs are computed to share resources where possible as determined by an IP routing protocol with Traffic Engineering (TE) extensions.

18. The apparatus of claim 14, wherein the non-transitory machine-readable medium further stores instructions that, when executed by the set of processors, cause said set of processors to further perform operations comprising:

determining that one of the plurality of receivers is to be removed from the session;

sending a PATH TEAR message to the one of the set of downstream nodes to reach the receiver that is to be removed from the session, wherein the PATH TEAR message identifies a point-to-point LSP to remove and includes the identifier of the P2MP LSP to cause the point-to-point LSP for the receiver to be removed from the P2MP LSP.

19. The apparatus of claim 18, wherein the non-transitory machine-readable medium further stores instructions that, when executed by the set of processors, cause said set of processors to further perform operations comprising:

responsive to determining that the one of the set of downstream nodes is involved only in a route to the receiver being removed, removing the label allocated by that downstream node from the mapping of the IP address associated with the P2MP LSP.

20. An apparatus, comprising:

a set of one or more processors of a core router;

a non-transitory machine-readable medium that stores instructions that, when executed by the set of processors, cause said processors to perform operations comprising:

receiving a set of one or more first PATH messages from an upstream node, wherein the set of first PATH messages identify at least a portion of a first point-to-point label switched path (LSP) between a source edge router and a first receiver edge router and identify at least a portion of a second point-to-point LSP between the source edge router and a second receiver edge router, wherein the set of first PATH messages each includes a same identifier of a point-to-multipoint (P2MP) LSP that includes a session object that contains a tunnel identifier and a P2MP identifier;

sending a second PATH message to a first downstream node on the first point-to-point LSP, the second PATH message including the identifier of the P2MP LSP;

sending a third PATH message to a second downstream node on the second point-to-point LSP, the third PATH message including the identifier of the P2MP LSP;

receiving, from the first downstream node, a first RESV message responsive to the second PATH message, the first RESV message including the identifier of the P2MP LSP and a first label allocated by the first downstream node;

receiving, from the second downstream node, a second RESV message responsive to the third PATH message, the second RESV message including the identifier of the P2MP LSP and a second label allocated by the second downstream node;

allocating a third label to be used by the upstream node when transmitting packets for the P2MP LSP to the core router;

mapping the third label with the first label and the second label to enable the core router to replicate packets that are received from the upstream node that are labeled with the third label, send each replicated packet to the first downstream node being labeled with the first label, and send each replicated packet to the second downstream node being labeled with the second label; and sending a set of one or more third RESV messages to the upstream node responsive to receiving the first RESV message and the second RESV message, wherein the set of third RESV messages each includes the identifier of the P2MP LSP and the third label.

21. The apparatus of claim 20, wherein the non-transitory machine-readable medium further stores instructions that, when executed by the set of processors, cause said set of processors to further perform operations comprising:

receiving a packet from the upstream node labeled with the third label;
labeling the packet with the first label;
sending the packet labeled with the first label to the first downstream node;
labeling the packet with the second label; and
sending the packet labeled with the second label to the second downstream node.

22. The apparatus of claim 20, wherein the upstream node is the source edge router attached to a source.

23. The apparatus of claim 20, wherein the upstream node is another core router.

24. The apparatus of claim 20, wherein the non-transitory machine-readable medium further stores instructions that, when executed by the set of processors, cause said set of processors to further perform operations comprising:

receiving a fourth PATH message from the upstream node, wherein the fourth PATH message identifies at least a portion of a third point-to-point LSP between the source edge router and a third receiver edge router, wherein the fourth PATH message includes the identifier of the P2MP LSP, and wherein a path of the third point-to-point LSP shares a same link between the core router and the first downstream node;

sending a fifth PATH message to the first downstream node, wherein the fifth PATH message includes the identifier of the P2MP LSP;

receiving, from the first downstream node, a fourth RESV message responsive to the fifth PATH message, the fourth RESV message including the identifier of the P2MP LSP and the first label; and sending a fifth RESV message to the upstream node responsive to receiving the fourth RESV message, wherein the fifth RESV message includes the identifier of the P2MP LSP and the third label.

* * * * *

UNITED STATES PATENT AND TRADEMARK OFFICE
CERTIFICATE OF CORRECTION

PATENT NO. : 8,605,723 B2
APPLICATION NO. : 13/305662
DATED : December 10, 2013
INVENTOR(S) : Aggarwal et al.

Page 1 of 1

It is certified that error appears in the above-identified patent and that said Letters Patent is hereby corrected as shown below:

In the Drawings

In Fig. 9, Sheet 10 of 13, for Tag "912", in Line 1, delete "MATCHNG" and insert -- MATCHING --, therefor.

In the Specification

In Column 6, Line 4, delete "device 300." and insert -- device. --, therefor.

Signed and Sealed this
Fifth Day of August, 2014

Michelle K. Lee
*Deputy Director of the United States Patent and Trademark Office*